May 23, 1933.  P. LAING  1,911,156

VARIABLE SPEED GEAR

Filed March 3, 1932   3 Sheets-Sheet 1

Inventor
Peter Laing
by Wilkinson & Mawhinney
Attorneys.

May 23, 1933. P. LAING 1,911,156
VARIABLE SPEED GEAR
Filed March 3, 1932 3 Sheets-Sheet 2
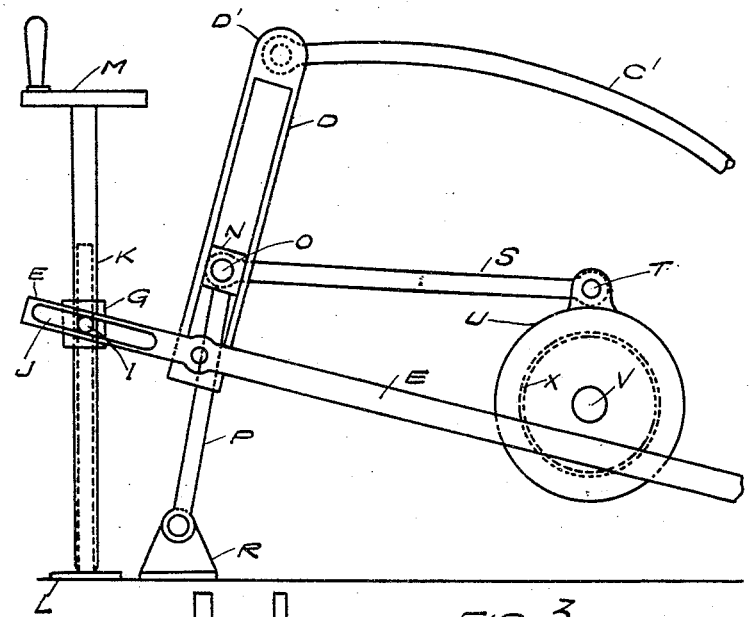
FIG. 3.
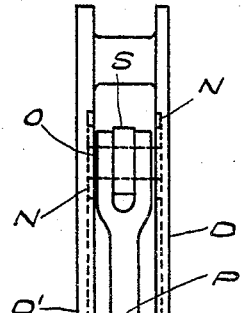
FIG. 4.
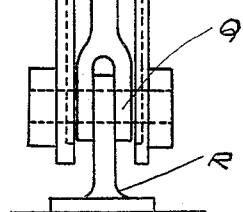
Inventor
*Peter Laing*
by *Wilkinson & Mawhinney*
Attorneys.

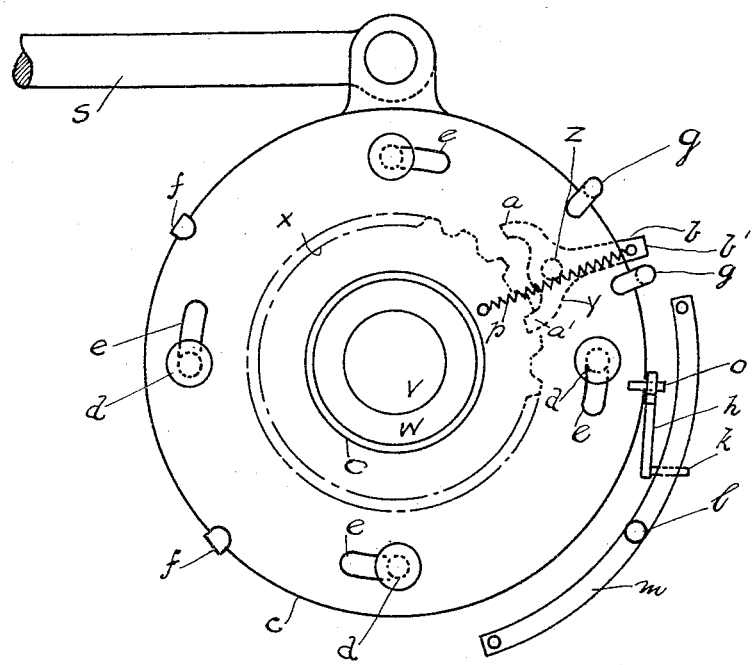
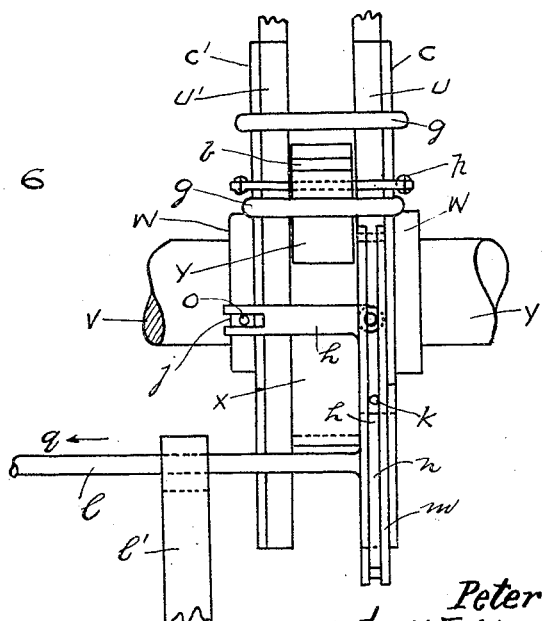

Patented May 23, 1933

1,911,156

UNITED STATES PATENT OFFICE

PETER LAING, OF TWECHAR, SCOTLAND

VARIABLE SPEED GEAR

Application filed March 3, 1932, Serial No. 596,606, and in Great Britain March 12, 1931.

My invention relates to variable speed gear for transmitting power from the driver to the driven shaft for motor vehicles, air-craft, ships and boats, and all other power transmission, and resides in the provision of means whereby the speed of the driven shaft can be increased gradually from zero up to maximum, or reduced from maximum to zero, while the power is being transmitted.

According to this invention, the power is transmitted from any number of cranks suitably connected to an equal number of slotted links, one end of each of which is pivoted on a yoke having an extension carrying a nut through which passes a screw or other means for raising or lowering the position of the yoke and slotted links. The slotted links are each suitably connected to one end of an equal number of connecting rods, the other end of each connecting rods being connected to suitably shaped carriers mounted on, but not fixed to the driven-wheel. These carriers may carry any suitable number of suitably constructed eccentric pawls acting on a wheel fixed to the driven shaft, which allow the carriers to be drawn or pulled back and the fixed wheel to run on freely, and, when the power is applied behind the rod, it drives or pushes the fixed wheel forward. The fixed wheel is suitably grooved to obtain the highest possible friction between the pawls and wheels, or, when the eccentric pawls as above described, are not employed ordinary straight pawls and ratchet wheels are used.

The reverse is obtained by either throwing over the pawl, which is attached by a spring acting on each side of the pawl, or by ordinary train of gears and dog-clutches.

In order that my invention may be properly understood and readily carried into effect, I have hereunto appended three sheets of drawings, of which Figure 1 is a side elevation illustrating my invention.

Figure 3 is a side elevation showing the gear in another position.

Figure 4 is an enlarged end view of the slotted link.

Figure 5 is an enlarged detailed view of the carrier showing the reversing pawl.

Figure 6 is an end view of Figure 5.

Figure 1:
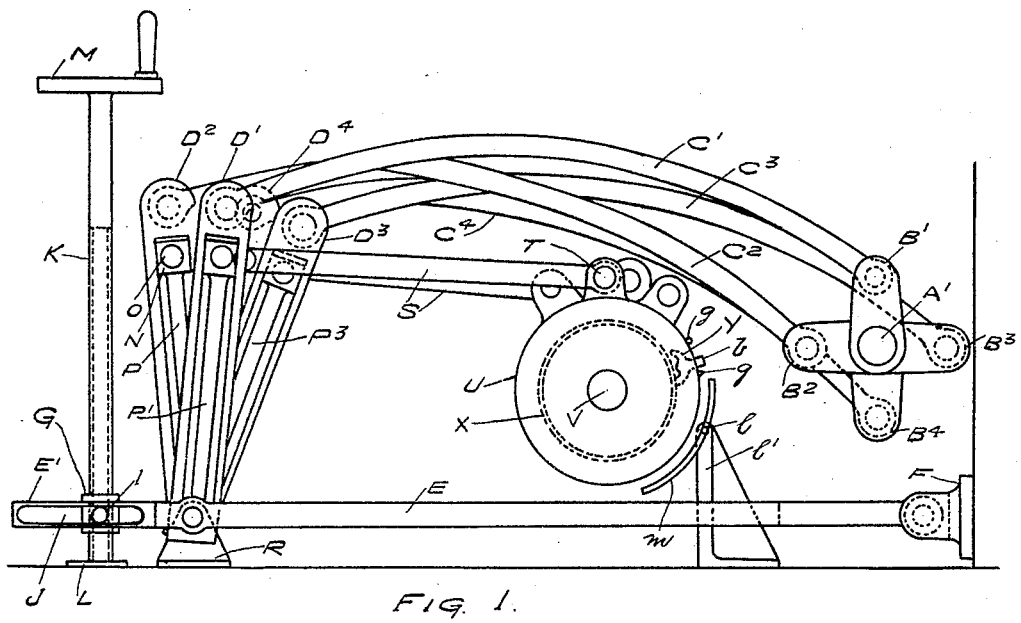
Figure 2:
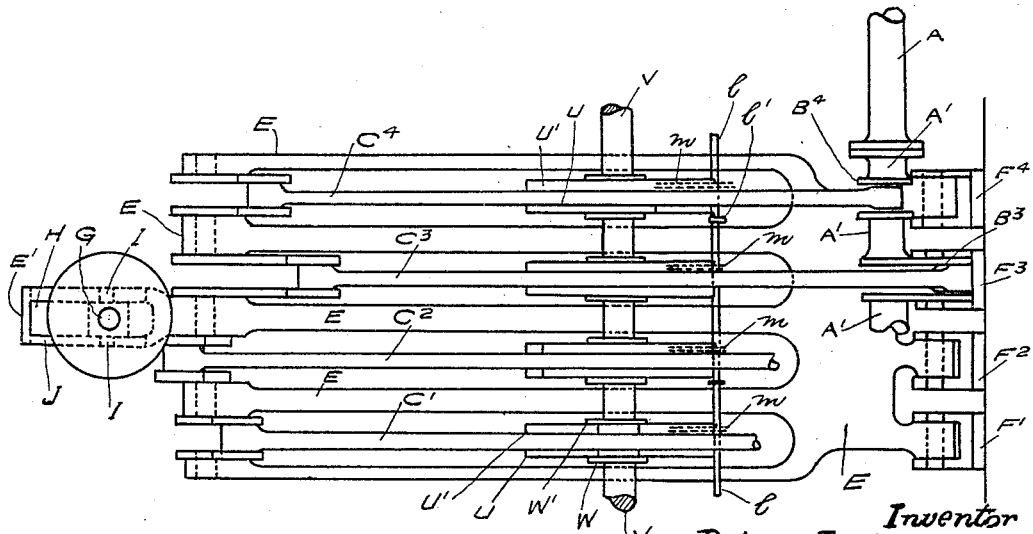
Figure 2 is a plan of Figure 1.

Referring to the drawings, A is the driving shaft to which is suitably connected a crank $A^1$, four cranks $B^1$, $B^2$, $B^3$, and $B^4$, being shown, to each of which there is pivotally attached on end of a connecting rod $C^1$, $C^2$, $C^3$, and $C^4$, respectively, the other ends of each of these rods $C^1$, $C^2$, $C^3$, and $C^4$, being pivotally connected to the top end of the slotted links $D^1$, $D^2$, $D^3$, and $D^4$, respectively. The bottom of each of these slotted links $D^1$, $D^2$, $D^3$, and $D^4$, is connected to one end of the hinged yoke E, the other end of this yoke E being suitably hinged to stationary brackets, $F^1$, $F^2$, $F^3$, and $F^4$. The yoke E is provided with an extension piece $E^1$, which carries a threaded nut G in a slot H, the nut G being provided with extensions I, which project from each side, and which engage with side slots J on the extension piece $E^1$. A suitably supported screw K engages with the nut G, the bottom of which bears against the base plate L, the top of the screw being provided with an operating handle M. By turning the handle M, the yoke E can be raised or lowered as desired, thus raising or lowering the slotted links $D^1$, $D^2$, $D^3$, and $D^4$.

It will be observed that four slotted links are illustrated, but as they are exactly alike, I will only describe the connections attached to the link $D^1$.

The slotted link $D^1$ carries within the slot two blocks N capable of sliding within the slot, and each block N is supported at the end of a pin O, which pin O has pivoted on it one end of a link-rod P, the other end of the link-rod being pivoted to a pin Q carried on a fixed bracket R, the link-rod P being positioned within the slotted-link $D^1$. The pin O has also pivoted to it one end of a connecting rod S, the other end of the rod S being connected to a pin T mounted on the carrier, which is mounted on the driven shaft V, and capable of freely rotating thereon.

The carrier consists of two discs U and $U^1$, suitably positioned between two collars W and $W^1$ suitably fixed to the driven shaft V, the pin T to which the rod S is connected extending across the discs U and U¹. Between these discs U and U¹ there is suitably fixed to the driven shaft V a ratchet-wheel X, the teeth of which engage with the pawl Y which is suitably positioned on a pin Z extending between the two discs U and U¹. The pawl Y has two engaging points $a$ and $a^1$ for "ahead" and "reverse" motion respectively, and is also provided with an extension $b$ which projects out with the discs U and U¹.

The reversing mechanism consists of two discs $c$ and $c^1$ on the outside of the discs U, U¹, and are attached thereto by means of the screws $d$, but are able to move circumferentially, slots $e$ being provided for that purpose. The two discs $c$ and $c^1$ are also connected together by strips $f$ and the striker-bars $g$. Two springs $p$ are provided, one end of each of which is fixed to a pin $b^1$ on the arm $b$, the other end of each of the springs $p$ being attached to the discs. A bell-crank $h$ is pivoted to the disc U, one arm of which being provided with a slot $j$, the other arm having a pin $k$ fixed thereto. A reversing rod $l$ carried on a suitable bearing $l^1$ fixed in any convenient position is also provided, and has attached to it a quadrant $m$ having a slot $n$ formed thereon, the pin $k$ of the bell-crank $h$ engaging with the quadrant slot $n$. A pin $o$ is suitably fixed to the disc $c^1$ and engages with the slot $j$ on the bell-crank $h$.

The modus operandi is as follows:—

The power is applied to the crank shaft A¹ and converted into an oscillating movement through the medium of the crank B¹, connecting rod C¹ and the link D¹. It is then transmitted from the link D¹ to the discs U and U¹, and then into rotary motion through the medium of the pawl Y engaging with the ratchet wheel X fixed to the driven shaft V. The discs U and U¹ are then pulled backwards, the pawl Y slipping over the ratchet wheel X until the beginning of the next stroke. While the action described is taking place, the remaining links are also at different positions giving forward and backward movement, thus giving a continuous motion to the driven shaft V. The variation in speed is obtained by the manipulation of the screw K or such like, which action raises or lowers the yoke E, and thus decreasing or increasing the movement of the link D¹ at the position where the connecting rod S engages with it. In Figure 1, the link D¹ is in the position when it gives the maximum stroke to the discs U and U¹, and in Figure 3 the link D¹ is in the position of a greatly decreased stroke transmitted to the discs U and U¹.

The reverse of the driven shaft is effected as follows:—

Assume the position illustrated in Figures 5 and 6 to be in the "ahead" motion, to change the direction of motion, the reversing rod $l$ is pulled a pre-determined distance in the direction of the arrow $q$, and the bell-crank $h$ is then actuated by means of the pin $k$ being carried along with the quadrant $m$. The pin $o$ is thus moved and carries the discs $c$ and $c^1$ with it. The striker-arm $g$ forces over the arm $b$ of the pawl Y, thus disengaging the point $a^1$ and engaging the point $a$ with the ratchet wheel X.

It is to be understood that the construction of the details of the gear may be varied and yet come within the scope of this invention.

Having now particularly described and ascertained the nature of my said invention and in what manner the same is to be performed, I declare that what I claim is:—

1. In a variable speed gear for power transmission comprising a driving shaft, crank arms equally spaced circumferentially thereon, a plurality of slotted links, rods for connecting each crank arm with the upper ends of a pair of said links to oscillate the same, a yoke provided with a slotted end portion, a nut having radially projecting pins engaging in said slotted end portion of the yoke, a rotatable screw engaging said nut, means for supporting said screw whereby the rotation of the screw raises or lowers the nut and the yoke, means for pivotally anchoring the opposite end of the yoke, pins for connecting the lower portion of the links with the yoke adjacent the slotted end portion of the same, blocks mounted for sliding movement in said slots of the links, arms, pins connecting the upper ends of the arms with the blocks, means for pivotally anchoring the lower ends of the arms, a driven shaft, ratchet wheels fixed on said shaft, spaced discs loosely mounted on the shaft, rods for connecting said discs and pins, spring pressed pawls carried by the discs to force the ratchet wheels in one continuous direction, additional discs supported by said spaced discs to move therewith, and means for rotating said additional discs with respect to said spaced discs whereby said pawls and discs are set to force the driven shaft in the reverse direction.

2. In a variable speed gear for power transmission comprising a driving shaft, crank arms equally spaced circumferentially thereon, a plurality of links, rods for connecting each crank arm with said links to oscillate the same, a yoke provided with a slotted end portion, a nut having radially projecting pins engaging in said slotted end portion of the yoke, a rotatable screw engaging said nut, means for supporting said screw whereby the rotation of the screw raises or lowers the nut and the yoke, means for pivotally anchoring the opposite end of the yoke, pins for connecting the lower portion of the links with the yoke adjacent the slotted end portion of the same, arms having one end slidable in said links, means for pivotally anchoring the opposite end of the arms, a driven shaft, ratchet wheels fixed on said shaft, spaced discs loosely mounted on the same, rods for connecting said spaced discs and arms to permit movement with said links to rotate the spaced discs, spring pressed pawls carried by the spaced discs to force the ratchet wheels in one continuous direction, additional discs supported by said spaced discs to move therewith, bell crank levers pivotally mounted on alternate spaced discs, comprising a slotted arm and a straight arm, pins fixed to said additional discs engaging each of said slotted arms, quadrants provided with guideways, pins carried by said straight arms engaging said guideways, a rod connected to the quadrants, and means for supporting said rod to permit sliding movement of the same whereby said pawls and discs are set to force the driven shaft in the reverse direction.

PETER LAING.